A. PRYM.
MACHINE FOR THE MANUFACTURE OF BUTTONS.
APPLICATION FILED JAN. 16, 1907.
916,593.
Patented Mar. 30, 1909.
7 SHEETS—SHEET 4.
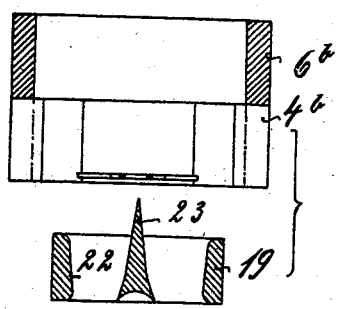
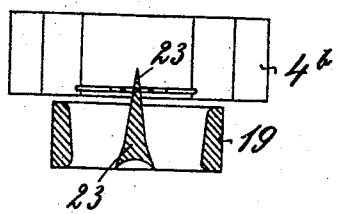
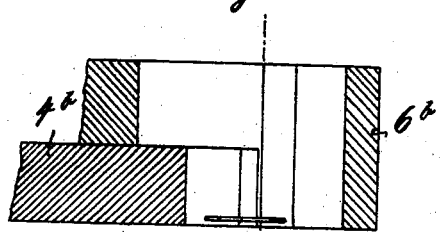
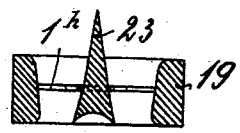
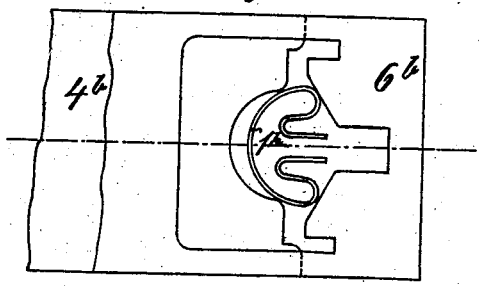

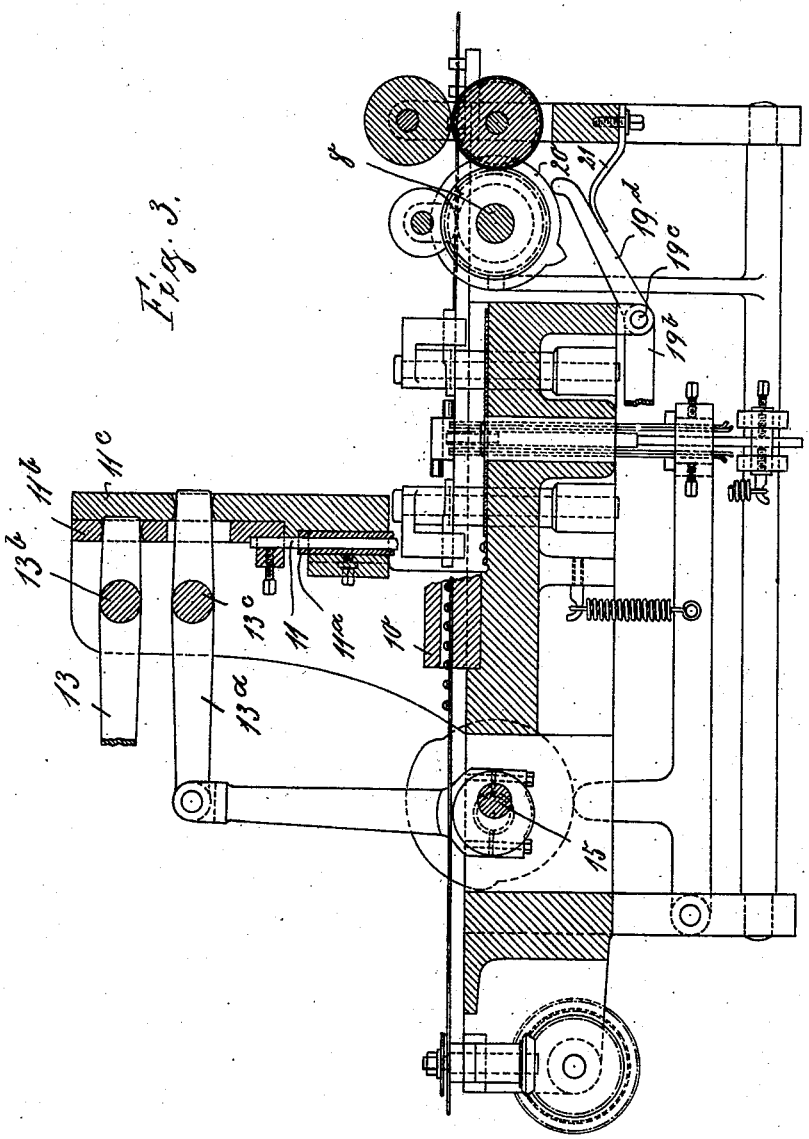

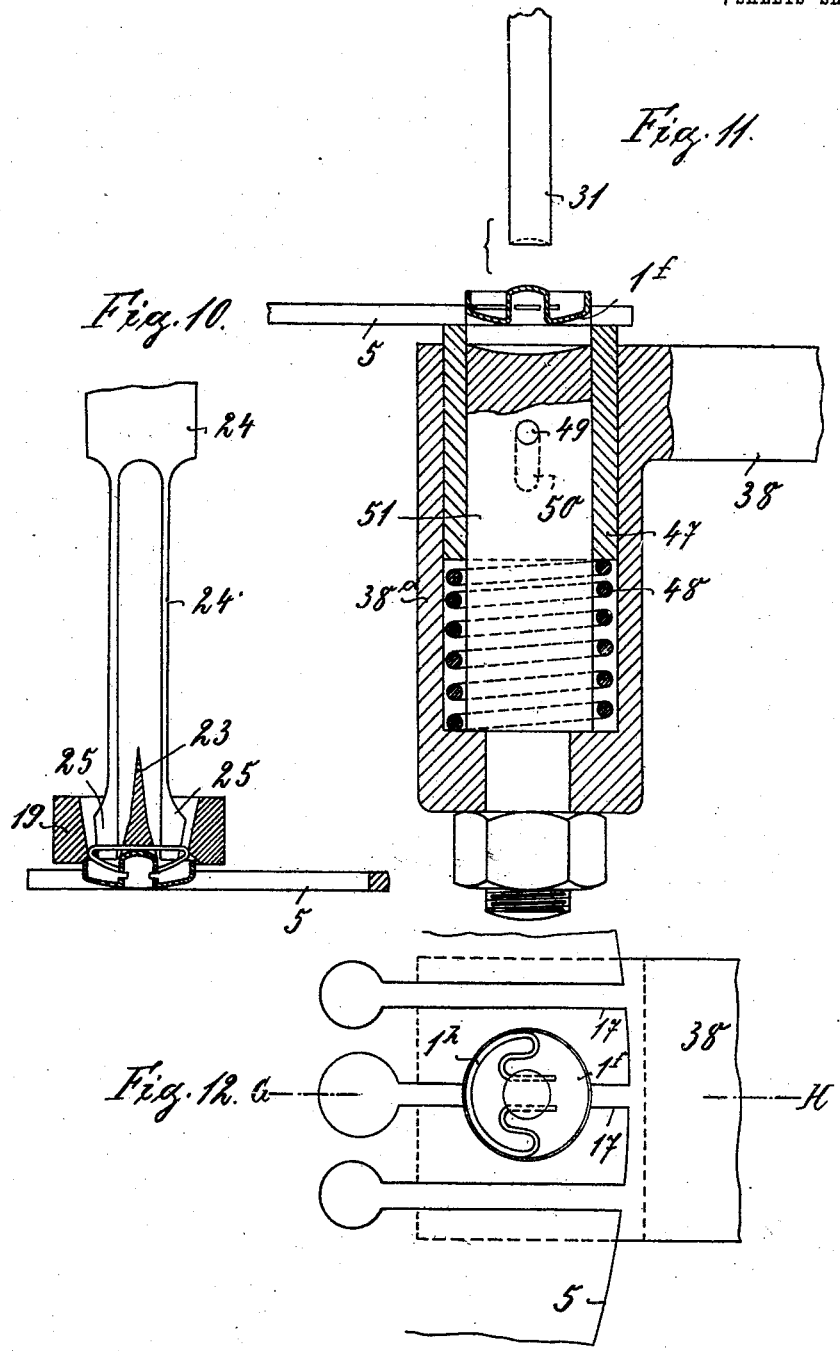

A. PRYM.
MACHINE FOR THE MANUFACTURE OF BUTTONS.
APPLICATION FILED JAN. 16, 1907.
916,593.
Patented Mar. 30, 1909.
7 SHEETS—SHEET 6.
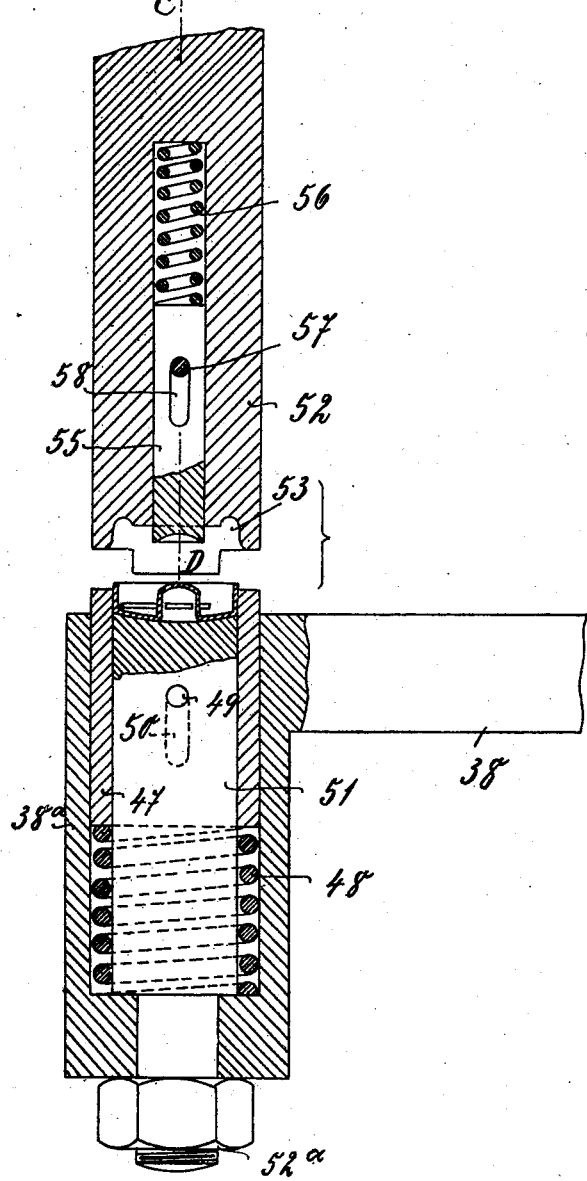
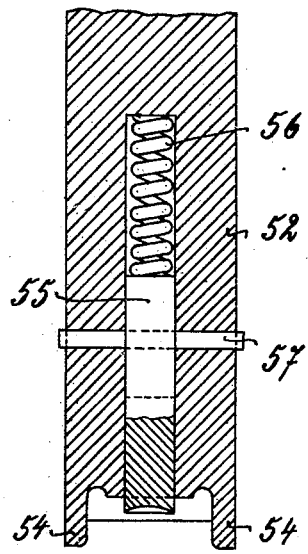

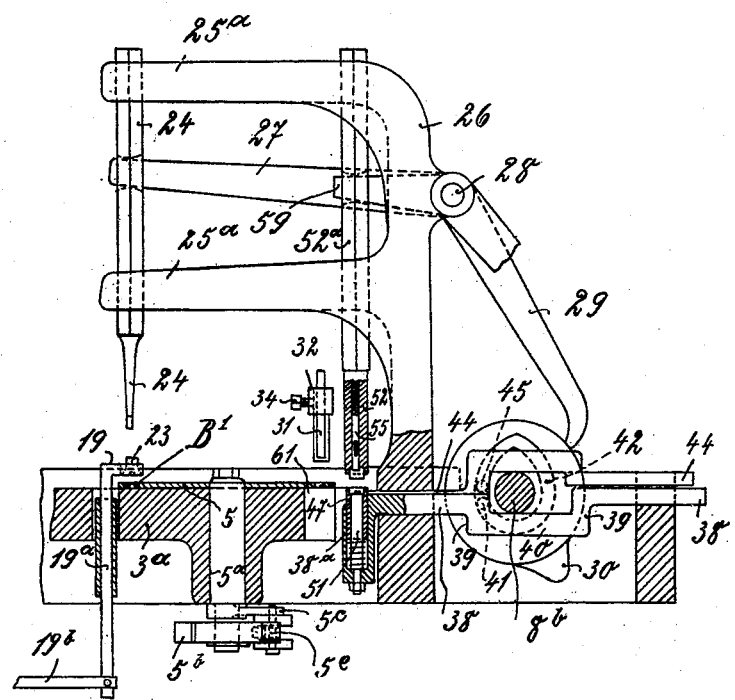

UNITED STATES PATENT OFFICE.

AUGUST PRYM, OF STOLBERG, GERMANY.

MACHINE FOR THE MANUFACTURE OF BUTTONS.

No. 916,593.  Specification of Letters Patent.  Patented March 30, 1909.

Application filed January 16, 1907. Serial No. 352,520½.

*To all whom it may concern:*

Be it known that I, AUGUST PRYM, a subject of the King of Prussia, German Emperor, and resident of Stolberg, in the Province of the Rhine, German Empire, have invented an Improved Machine for the Manufacture of Buttons, of which the following is an exact specification.

My invention relates to an improved machine for the manufacture of the lower part of press buttons. As is well known the lower part of such press buttons consists of a sleeve or socket into which a closing spring is inserted which serves for the connection of the said socket or sleeve with the counter part of the press button. The machine adopted by me for the manufacture of such lower parts provides firstly projections or cups in a narrow metal strip by a punching or the like operation. This narrow metal strip is fed through the machine in any suitable manner and subjected to successive different operations in the course of which the finished lower part is formed. On their passage through the machine the cups in the middle of the lower part of the press button are provided with lateral slits which serve to receive the springs that are inserted later on. The narrow metal strip travels farther on in the machine and the lower part together with the cup is punched out and introduced into a so-called revolving conveyer-disk, the edge of the lower part being at the same time turned in. The lower part together with the conveyer disk now make a quarter of one complete revolution and come to a point, where the closing spring is to be inserted. This insertion is followed by a further rotation of the conveyer disk together with the lower part and the spring to a point where the lower part is completed by turning in the edge of the lower part of the press button. This operation being done, the lower part is finally pushed away from the tool serving for the turning in operation and is ready for its combination with the counter-button.

Figure 1:
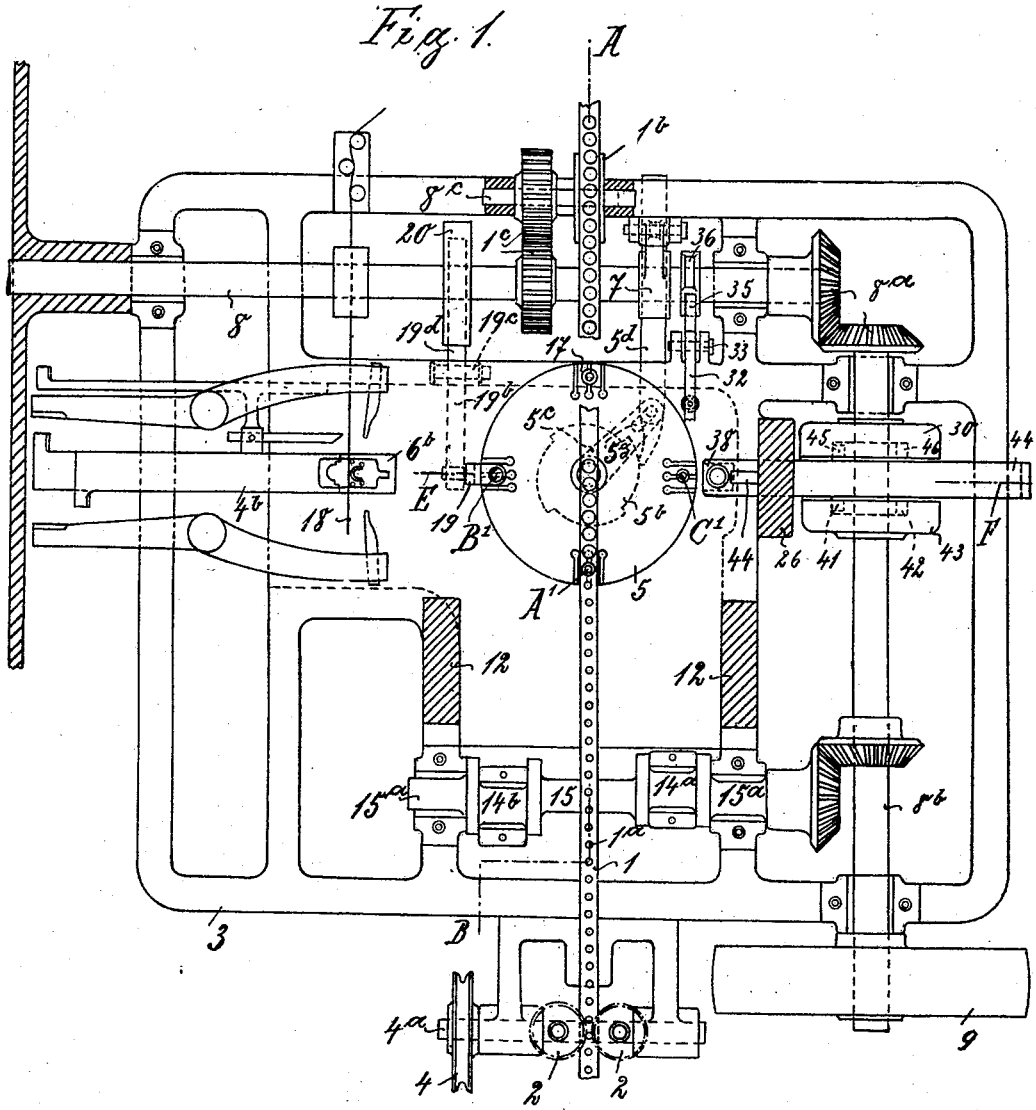
Figure 2:
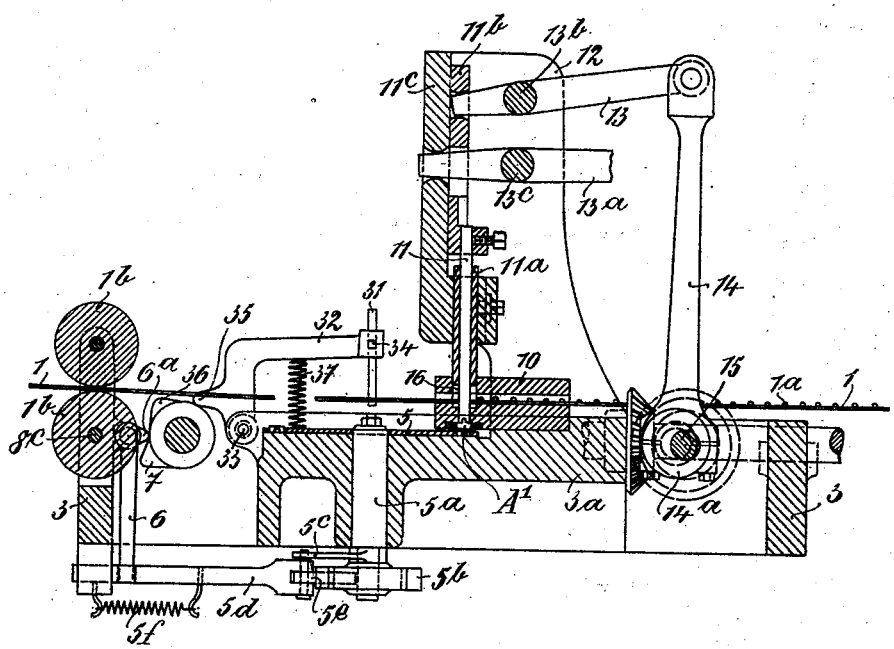

In order to make my invention clear, I refer to the accompanying drawings, in which:

Figure 1 is a fragmentary sectional plan view of the machine by means of which the successive steps in manufacturing the lower parts are carried on, Fig. 2 is a fragmentary section on line A—B of the Fig. 1, the view taken to the righthand side of this figure, Fig. 3 is a vertical section on line A—B of the Fig. 1, looked to the lefthand side. Figs. 4 to 10 represent details of the machine which serve for the insertion of the springs into the lower socket or sleeve of the lower part of the press-button. The Fig. 11 is a fragmentary vertical section on line G—H of Fig. 12 of a detail of the machine which serves for the discharge of the said socket or sleeve from the revolving conveyer disk to a slide to turn in the upper edge of said socket. Fig. 12 is an upper plan view of the Fig. 11, Fig. 13 is a fragmentary vertical section of the contrivance by means of which the turning in of the upper edge of said socket or sleeve takes place, Fig. 14 is a fragmentary section of the upper part of the Fig. 13 on line C—D, and Fig. 15 is a fragmentary sectional elevation of the machine on line E—F of the Fig. 1. Same reference numbers denote same parts throughout the several figures.

1 is the narrow metal strip provided with cups $1^a$ by a punching operation which is known and does not form part of my invention.

2 are small circular saws mounted on the machine frame 3 and suitably driven, for instance by a belt pulley 4 mounted on the shaft $4^a$ and bevel gears (not further shown).

The narrow metal strip 1 is fed through the machine by means of the feeding rollers $1^b$ (see Fig. 2) which are operated in any suitable manner, as for instance described with regard to the small circular saws 2.

5 is a thin circular plate or disk, the so-called conveyer-disk mounted on a vertical shaft $5^a$.

$5^b$ is a pawl wheel fixedly mounted on the vertical shaft $5^a$.

$5^c$ is a pawl arm loosely mounted on the shaft $5^a$ and pivotally secured to the lever $5^d$.

$5^e$ is a pawl bearing on the pawl-wheel $5^b$ and hinged to the lever $5^d$. The latter is mounted in the machine-frame 3 and adapted to be moved to and fro by means of the arm 6 of the angle lever, the shorter arm $6^a$ of which bears against a cam disk 7.

$5^f$ is a spring which causes the lever $5^d$ to move backward after an advance has taken place.

8 is a driving shaft carrying the cam disk 7 and operated by the bevel gearing $8^a$ and the shaft $8^b$ upon which the belt pulley 9 is mounted for the operation of the machine.

As will be seen from the drawing the rollers 1$^b$ for feeding the metal strip 1 are put in rotation by means of the toothed wheels 1$^c$, which are mounted on the shaft 8 and the shaft 8$^c$ respectively.

10 is a guiding body mounted on the machine table 3$^a$ and provided with a passage for the metal strip 1, this body being arranged at the point A' of the conveyer disk 5.

11 and 11$^a$ designate a double punch secured with the supports 11$^b$ and 11$^c$ respectively which parts are mounted on the bracket 12.

13 and 13$^a$ are two double-armed levers in connection with the supports 11$^b$ and 11$^c$ respectively and carried by the pivots 13$^b$ and 13$^c$ respectively.

14 is an eccentric rod hinged to the lever 13 at its upper end and provided with an eccentric 14$^a$ at its lower end. The latter is mounted on the crank shaft 15 mounted in bearings 15$^a$.

14$^b$ is an eccentric serving for the operation of the lever 13$^a$, which is partially broken for the sake of clearness.

The punch 11 is provided at its lower end with a recess for preventing the cups 1$^a$ from being damaged. The guiding body 10 is provided with an orifice 16 restricted in its lower part in accordance with the diameter of the punch 11. The orifice 16 is adapted to the required size of the lower part of the press button and due to the provision of the restriction of the orifice 16 the lower part is turned in when forced downward by means of the punch 11.

17 are tongs arranged in the conveyer disk 5 (Fig. 12) and provided with notches for receiving the lower part of the press button. As will be seen from the drawings such tongs with notches are provided at four points of the conveyer disk at an angle of 90 degrees apart. At the point B' the insertion of the spring is carried out in the manner as will now be fully decribed.

4$^b$ and 6$^b$ (Fig. 1) are two slides adapted to be horizontally reciprocated and provided with arrangements for imparting to the wire 18 a shape suitable for springs in press buttons. The arrangement and the operation of the parts serving for the manufacture of such springs forms the object of a separate application which is filed together with the present application.

19 is a guide, (see Figs. 4 and 15), and 19$^a$ is a vertically arranged rod mounted in a recess of the machine table 3$^a$ and carrying at its upper end the guide 19. The lower end of the rod 19$^a$ is connected with the arm 19$^b$ of a double-armed lever hinged at 19$^c$ to the machine table. (See Fig. 3). The arm 19$^d$ bears against the cam disk 20 fixedly mounted on the shaft 8 and held in contact therewith by the spring 21. The guide 19 is provided with an inner opening 22 which is mainly conical. 23 is a peg within the said opening 22 of the guide 9 (see Figs. 4, 5 and 7.)

24 is a plunger which can be moved up and down vertically and is split or divided at its lower end to form fingers 25. (Fig. 10.) The plunger 24 is mounted in the bearing arms 25$^a$ of the bracket 26 and the arm 27 of the lever hinged at 28 to the bracket 26 projects through an opening in the plunger 24. The other arm 29 of this lever bears on the circumference of a cam disk 30, carried by the shaft 8$^b$.

The lower part of the press button is ejected from the conveyer disk 5 at the point C' by means of the plunger 31 (see Figs. 2 and 15).

32 is a lever pivotally connected at 33 to the machine table 3$^a$ and carrying the plunger 31 secured to the latter by means of a set screw 34.

35 is a projection or nose on the vertically arranged part of the lever 32 and it abuts against the cam 36 which is arranged on the shaft 8 and imparts to the lever 32 and the plunger 31 an up-and-down motion. The spring 37 causes the lever 32 to rise after the latter has been moved downward.

The ejected lower part of the press button is received by the slide 38 (see Figs. 13 and 15). The latter is mounted in the machine table and is provided near its middle with two vertical parts 39 connected with each other by the horizontal union piece 40 thus forming a passage as to allow the shaft 8$^b$ to pass. The slide 38 is provided with a pin or pivot 41 projecting therefrom into the groove 42 of the cam 43 (see Fig. 1).

44 is a slide similarly constructed in its middle part as the slide 38 and provided with a pin or pivot 45 engaging with the groove 46 (Fig. 1). This groove is arranged in the cam 30 fixedly mounted on the shaft 8$^b$. Both the slides 38 and 44 receive a to-and-fro motion when the cam-disks 43 and 30 are rotated.

The proper construction of the slide 38 is fully illustrated in Figs. 11 and 13. The slide 38 is provided with a right-angled extremity 38$^a$ forming a cylinder or sleeve. 47 is a socket arranged within said cylinder 38$^a$ and 48 is a spring intended to force the socket 47 upward. The latter is provided with two lateral pins 49 located therewith in grooves or recesses 50 of the cylinder 38$^a$ so that the stroke of the socket 47 is limited. 51 is a die or punch located in said socket 47 and secured to the cylinder 38$^a$ by means of the bolt 52$^a$. The upper end of the punch 51 is slightly recessed as to afford an abutment to the lower part of the press button. 52 is a punch arranged vertically above the punch 51 and coöperating therewith for the purpose of turning in the upper edge of the socket of said lower part of the press button.

The lower end of the punch 52 is provided with a recess 53 and with lateral projections 54 the purpose of which will be hereinafter indicated.

55 is a plunger located in a recess of the punch 52 and operated by a helical spring 56.

57 is a rod or pin fixedly mounted in the punch 52 and passing through the slot 58 of the plunger 55, the length of which determines the stroke of the plunger. The punch 52 is connected with the rod $52^a$ (Fig. 15) mounted in the bracket 26 and in connection with the arm 59 of a lever hinged at 28 to the bracket 26. The other arm 60 of this lever bears on the circumference of the cam disk 43, the arm being broken for the sake of clearness.

61 is a recess provided in the machine table $3^a$ as to permit the cylinder $38^a$ of the slide 38 to pass below the conveyer disk 5.

The operation of the machine is as follows:—The narrow metal strip 1 which is provided with cups $1^a$ is fed through the machine by means of the rollers $1^b$ which are operated from the shaft 8 by means of the toothed wheels $1^c$. By means of the small circular saws 2 the cups $1^a$ are provided with two lateral slits. It may be mentioned that it is not necessary to cut the slit by means of saws, but these slits can be provided by a convenient punching operation. The narrow metal strip 1 travels farther and arrives at the point $A'$ where the lower part of the press button is punched out of the metal strip to the required size by means of the double punch $11^a$ and 11. Firstly the punch $11^a$ is lowered by means of the lever 13 and the eccentric $14^a$, whereby the metal strip is punched out to the required diameter. Then the punch 11 is operated to force the punched out metal part through the lower smaller part of the recess 16 whereby the lower part of the press button is turned in around the edge and afterward introduced by a further lowering of the punch 11 into the conveyer disk and in which it is held securely by the elastic tongs 17 (see Fig. 12). The lower part $1^b$ is fed by means of the conveyer disk 5 from the point $A'$ to the point $B'$. The conveyer disk 5 is operated by means of the rod $5^d$, the finger $5^e$ of which engages the pawl wheel $5^b$. As will be seen from the Fig. 1, the pivot which connects the rod $5^d$ with the pawl $5^c$ is located within a groove $5^g$ which permits the pawl $5^c$ to swing. The rod $5^d$ is moved to and fro by means of the angle lever 6 the arm $6^a$ of which is operated by the cam disk 7. At the point $B'$ the spring $1^h$ (see Fig. 8) is inserted into the lower part $1^f$. The spring $1^h$ is carried by means of the slides $4^b$ and $6^b$ which are adapted to be advanced to the part 19 (see Fig. 4), by means of which the spring $1^h$ is conveyed to the lower part $1^f$ of the press button and the conveyer-disk 5. For this purpose both the slides $4^b$ and $6^b$ are moved forward in the relative position, as illustrated in Fig. 8 till the slides are opposite the guide 19, as illustrated in Fig. 4. Then the guide 19 is raised by means of the lever $19^b$, $19^d$ and the cam disk 20 to the position of the Fig. 5. The slides $4^b$ and $6^b$ are operated in such manner that now the spring $1^h$ is released, and it drops upon the spreading peg 23 in said guide 19. The guide 19 is brought as near as possible to the slides $4^b$ and $6^b$ superposed in order that the spreading peg 23 may catch the spring with certainty. The spring dropped down occupies the position as illustrated in Fig. 7 and 9, and has to be conveyed to the lower part $1^f$. This is effected by means of the plunger 24 and its fingers 25. The plunger 24 is moved downward by means of the lever 27 and the cam disk 30 rotated by the shaft $8^b$. Before the plunger 24 begins to descend the guide 19 is lowered by the arrangement as before described and to the position as illustrated in Fig. 10. Then the plunger 24 is lowered and as the inner opening 22 of the guide 19 is conical, the spring $1^h$ is gradually pressed together in its outer circumference. As will be seen from Fig. 10 the inner diameter of the smallest cross-section of the guide 19 is a little smaller than the inner diameter of the lower part of the press button, thus insuring the certain insertion of the spring into the said lower part. After the insertion of the spring into the lower part of the press button the plunger 24 rises and the work is by the conveyer disk 5 conveyed to the point $C'$, where the work is removed from the conveyer disk 5. With this object in view the slide 38 is advanced toward the conveyer disk 5 (see Figs. 11 and 12) and the cylinder $38^a$ enters the recess 61 of the machine table $3^a$. The rod 31 is now caused to move downward by the projection 35 engaging the rotating cam disk 36 carried by the shaft 8. The lower part $1^f$ is received by the socket 47, which extends a little beyond the slide 38, the rod 31 rises to the original position. The slide 38 is now withdrawn from the recess 61 and brought below the plunger 52 (see Figs. 13 and 15). At this point the upper edge of the lower part of the press button is turned in in the manner as will now be described.

The lower part is held fast in its position by means of the spring socket 47. The punch 52 is moved downward by means of the lever 59, operated by the cam disk 43. The upper edge of the lower part enters the recess 53 of the punch 52 and slides along the walls of the said recess. At the same time the spring socket 47 is depressed by means of the projections 54. By the further lowering of the punch 52 the upper edge of the lower part is perfectly turned in due to the particular shape of the recess 53. During this operation the plunger 55 is moved upward, so that the finished lower part is completely inclosed by the recess 53 of the punch 52. If now the latter is lifted again the spring 56 depresses the plunger 55, whereby the lower part is removed from the recess 53 and held fast by means of the noses 54, while it is otherwise free. The slide 44 comes now into action and is moved to the lefthand side by means of the cam disk 30. The lower part of the press button is thereby pushed away from the noses of the punch 52 whereupon the said lower part in a finished condition is received by a collecting box.

Having thus fully described the nature of my invention, and in what manner the same is to be performed, what I desire to secure by Letters Patent of the United States is:—

1. In a button making machine in combination, means for inserting springs into button blanks comprising a support for the button blanks, a rigid guide receiving the springs and widening toward the button blanks, a pusher for pushing said springs over said rigid guide and entering said springs in the blank in a tensioned state for the purpose set forth.

2. In a button making machine in combination, means for inserting springs into the button blanks comprising, a support for the button blanks, a guide receiving said springs, a tapered wedge part (23) on said guide and widening toward the button blank for expanding said springs and a pusher for pushing said springs over said wedge part and entering said springs into said button blank.

3. In a machine for manufacturing the lower parts of press buttons, in combination a vertically reciprocating and longitudinally recessed punch (52) having a recessed bottom, and projections (54) adapted to hold the finished lower button part, a spring pressed plunger (55) located in the longitudinal recess of the punch (52), a horizontally reciprocating slide (44) arranged below the punch and adapted to pass through between the said projections for discharging the finished button part from the plunger, and means for operating the punch and the slide.

In witness whereof I have hereunto set my hand in the presence of two witnesses.

AUGUST PRYM.

Witnesses:
ALVESTO S. HOGUE,
AUGUST FUGGER.